United States Patent
Jiang et al.

(10) Patent No.: US 12,231,814 B1
(45) Date of Patent: *Feb. 18, 2025

(54) APPARATUS FOR CAPTURING A GROUP PHOTOGRAPH DURING A VIDEO CONFERENCING SESSION

(71) Applicant: Zoom Video Communications, Inc., San Jose, CA (US)

(72) Inventors: Dingping Jiang, Hefei (CN); Juan Jiang Wald, Sunnyvale, CA (US); Liang Wang, Hefei (CN); Huipin Zhang, Palo Alto, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,687

(22) Filed: Jun. 20, 2023

Related U.S. Application Data

(63) Continuation of application No. 17/862,960, filed on Jul. 12, 2022, now Pat. No. 11,722,639, which is a
(Continued)

(51) Int. Cl.
*H04N 7/15* (2006.01)
*H04L 65/403* (2022.01)

(52) U.S. Cl.
CPC ........... *H04N 7/155* (2013.01); *H04L 65/403* (2013.01); *H04N 7/152* (2013.01)

(58) Field of Classification Search
CPC .......... H04N 7/155; H04N 7/152; H04N 7/15; H04L 65/403
See application file for complete search history.

(56) References Cited

U.S. PATENT DOCUMENTS 9,112,912 B1 *  8/2015  Anand .................... H04L 63/20
9,641,572 B1 *  5/2017  Yeskel .................... G06Q 50/01
(Continued)

OTHER PUBLICATIONS

U.S. Appl. No. 17/100,682 , "Final Office Action", Nov. 30, 2021, 8 pages.
(Continued)

*Primary Examiner* — Olisa Anwah
(74) *Attorney, Agent, or Firm* — Kilpatrick Townsend & Stockton LLP

(57) ABSTRACT

In various embodiments, a group photograph system coordinates and creates a group photograph of participants of a video conferencing session. Using inputs from the participants, the group photograph system captures images of individual participants and selectively assembles a group photograph based on the rating of each individual participant. In one embodiment, the group photograph system sends a countdown signal to a first participant and a second participant wherein the first participant and the second participant are part of a group photograph within a video conferencing session wherein the countdown signal represents an amount of time before a first participant image is captured of the first participant. In another embodiment, the group photography system captures the first participant image and a second participant image of the first participant and the second participant, respectively and creates a first group photograph which includes the first participant image and the second participant image.

20 Claims, 8 Drawing Sheets

Related U.S. Application Data continuation of application No. 17/100,682, filed on Nov. 20, 2020, now Pat. No. 11,418,759, which is a continuation of application No. 16/716,290, filed on Dec. 16, 2019, now Pat. No. 10,880,520, which is a continuation of application No. 16/359,390, filed on Mar. 20, 2019, now Pat. No. 10,523,900.

(56) References Cited

U.S. PATENT DOCUMENTS

| | | | |
|---|---|---|---|
| 10,217,029 B1 * | 2/2019 | van Rensburg | G06V 40/174 |
| 10,567,450 B1 | 2/2020 | Gopal et al. | |
| 10,880,520 B2 | 12/2020 | Jiang et al. | |
| 11,418,759 B2 | 8/2022 | Jiang et al. | |
| 11,722,639 B2 | 8/2023 | Jiang et al. | |
| 2002/0154147 A1 * | 10/2002 | Battles | H04N 1/00196 |
| | | | 345/660 |
| 2009/0257730 A1 | 10/2009 | Chen et al. | |
| 2010/0254672 A1 * | 10/2010 | Gottlieb | H04N 21/4117 |
| | | | 382/284 |
| 2011/0013038 A1 * | 1/2011 | Kim | H04N 23/611 |
| | | | 348/222.1 |
| 2015/0370830 A1 * | 12/2015 | Murphy-Chutorian | G06Q 10/00 |
| | | | 707/748 |
| 2016/0124994 A1 * | 5/2016 | Caicedo | G06F 16/5838 |
| | | | 707/723 |
| 2018/0150433 A1 * | 5/2018 | Sowden | G06F 3/0481 |
| 2018/0152746 A1 * | 5/2018 | Lin | H04N 21/8153 |
| 2018/0173959 A1 * | 6/2018 | Shah | G06V 40/168 |
| 2019/0289225 A1 * | 9/2019 | Vonikakis | H04N 5/2621 |
| 2019/0340305 A1 | 11/2019 | Amir et al. | |
| 2021/0227151 A1 | 7/2021 | Song et al. | |
| 2022/0337779 A1 | 10/2022 | Ahn et al. | |

OTHER PUBLICATIONS

U.S. Appl. No. 17/100,682 , "Non-Final Office Action", Aug. 24, 2021, 8 pages.

U.S. Appl. No. 17/100,682 , "Notice of Allowance", Apr. 13, 2022, 5 pages.

U.S. Appl. No. 17/862,960 , "Final Office Action", Mar. 6, 2023, 9 pages.

U.S. Appl. No. 17/862,960 , "Non-Final Office Action", Dec. 12, 2022, 8 pages.

U.S. Appl. No. 17/862,960 , "Notice of Allowance", Mar. 21, 2023, 6 pages.

\* cited by examiner

| | Participant 1 | Participant 2 | ..... | Participant N |
|---|---|---|---|---|
| Group Photo 1 | Yes | No | | No |
| Group Photo 2 | Yes | Yes | | Yes |
| Group Photo 3 | No | Yes | | Yes |

Figure 4

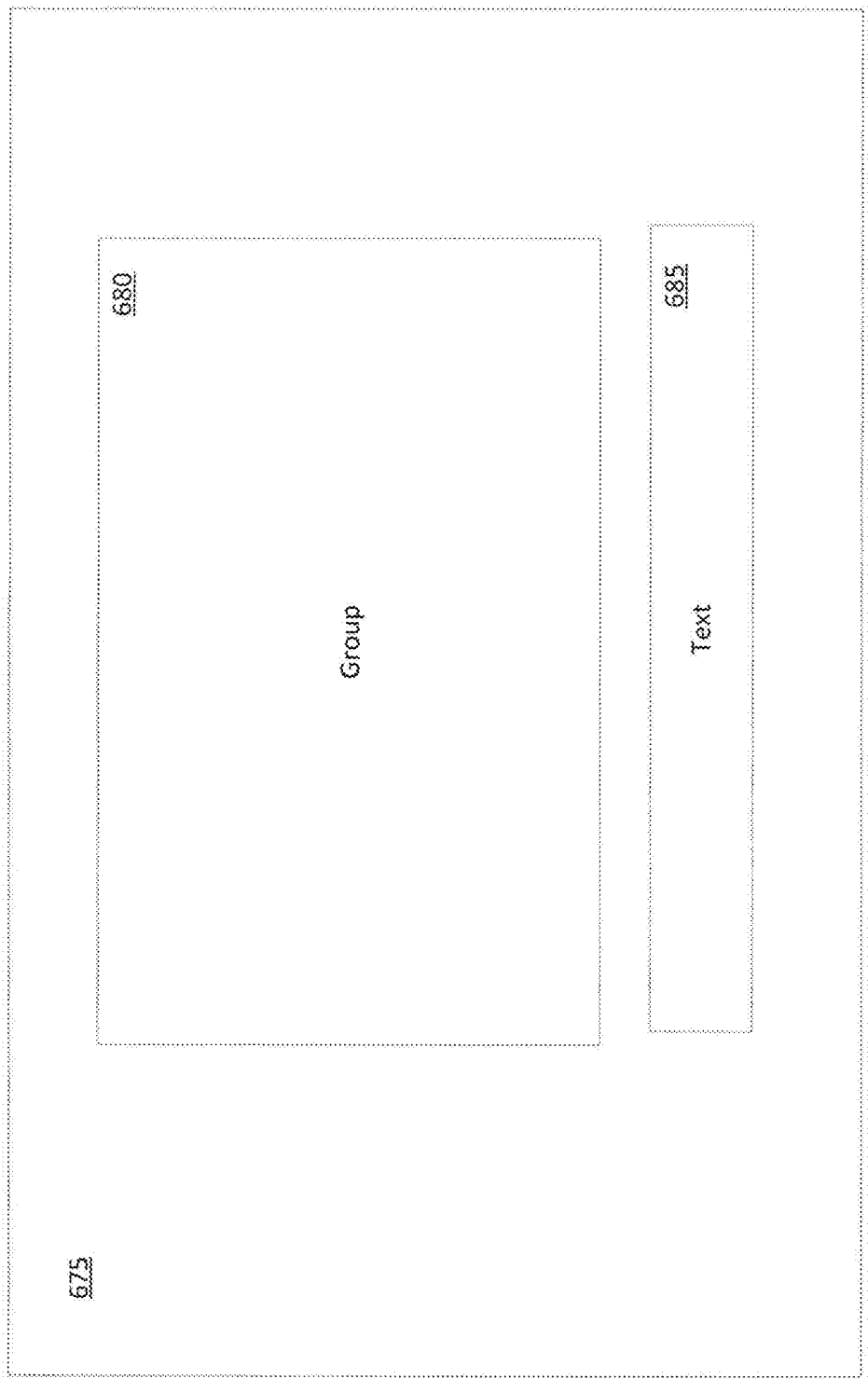

APPARATUS FOR CAPTURING A GROUP PHOTOGRAPH DURING A VIDEO CONFERENCING SESSION

PRIORITY

This patent application is a continuation of a co-pending U.S. patent application having a U.S. patent application Ser. No. 17/862,960, filed on Jul. 12, 2022, which is a continuation of U.S. patent application Ser. No. 17/100,682, filed on Nov. 20, 2020, which has since issued as U.S. Pat. No. 11,418,759, which is a continuation of U.S. patent application Ser. No. 16/716,290, filed on Dec. 16, 2019, which has since issued as U.S. Pat. No. 10,880,520, which is a continuation of a U.S. patent application Ser. No. 16/359,390, filed on Mar. 20, 2019 in the name of the same inventor and entitled "Methods and Apparatus for Capturing A Group Photograph during A Video Conferencing Session," which has since issued as U.S. Pat. No. 10,523,900, all of which are hereby incorporated herein by reference in their entirety.

FIELD OF THE DISCLOSURE

The exemplary embodiment(s) of the present invention relates to the field of video conferencing. More specifically, the exemplary embodiment(s) of the present invention relates to capturing a group photograph of the attendees during a video conferencing session.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The notion of a group photograph has been around for many decades. Having a group photograph of participants who attend an event can serve to record which participants attended the gathering. In addition, a group photograph of the participants can also serve as a souvenir for the participants to commemorate attendance of the special event.

In the case of a physical meeting, the participants can assemble in the same location and pose together so a photograph can be taken of the entire group of participants. The act of coming together and posing for the group photograph is also a shared experience and captures a moment in time of the event.

In a virtual meeting where the meeting occurs through a video conferencing session, assembling the group of attendees in a single physical location for a group photograph is not possible since a video conferencing meeting has attendees participating in remote or virtual locations. It is a challenge to create a group photograph of the participants during a video conferencing meeting.

What is needed is a system and method for creating a group photograph of the participants during a video conferencing meeting.

SUMMARY

The appended claims may serve as a summary of the invention.

BRIEF DESCRIPTION OF THE DRAWINGS

In the drawings:

FIG. 4 illustrates a data chart according to an embodiment.

FIGS. 6A, 6B, and 6C illustrate exemplary screen shots according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. Overview
2. Group Photograph Creation
3. Example Embodiments
4. Example Implementation Mechanism-Hardware Overview

1. OVERVIEW

During a video conferencing session, participants can communicate with each other via voice, video and screen sharing. Screen sharing can include sharing content of the presenter's screen which includes graphics, video, images, and documents with other attendee participants. Endpoint devices are typically operated by the video conferencing participants and can transmit and receive voice, video and screen sharing content during a web conferencing session. Each of the endpoint devices represents participants and each participant can be either a presenter which shares information, an attendee which receives information, or both presenter and attendee at the same time. Roles of the participants can dynamically change between presenter and attendee during the same video conferencing session.

During the video conferencing session, a group photograph is created of the participants of the video conferencing session. Although the participants are in different physical locations and using different endpoint devices, the group photograph is created as if the participants were located in a single location and posing for the group photograph at the same time.

The endpoint devices include computers, tablet PCs, and smart phones are widely used in the workplace as well as at home.

Figure 1:
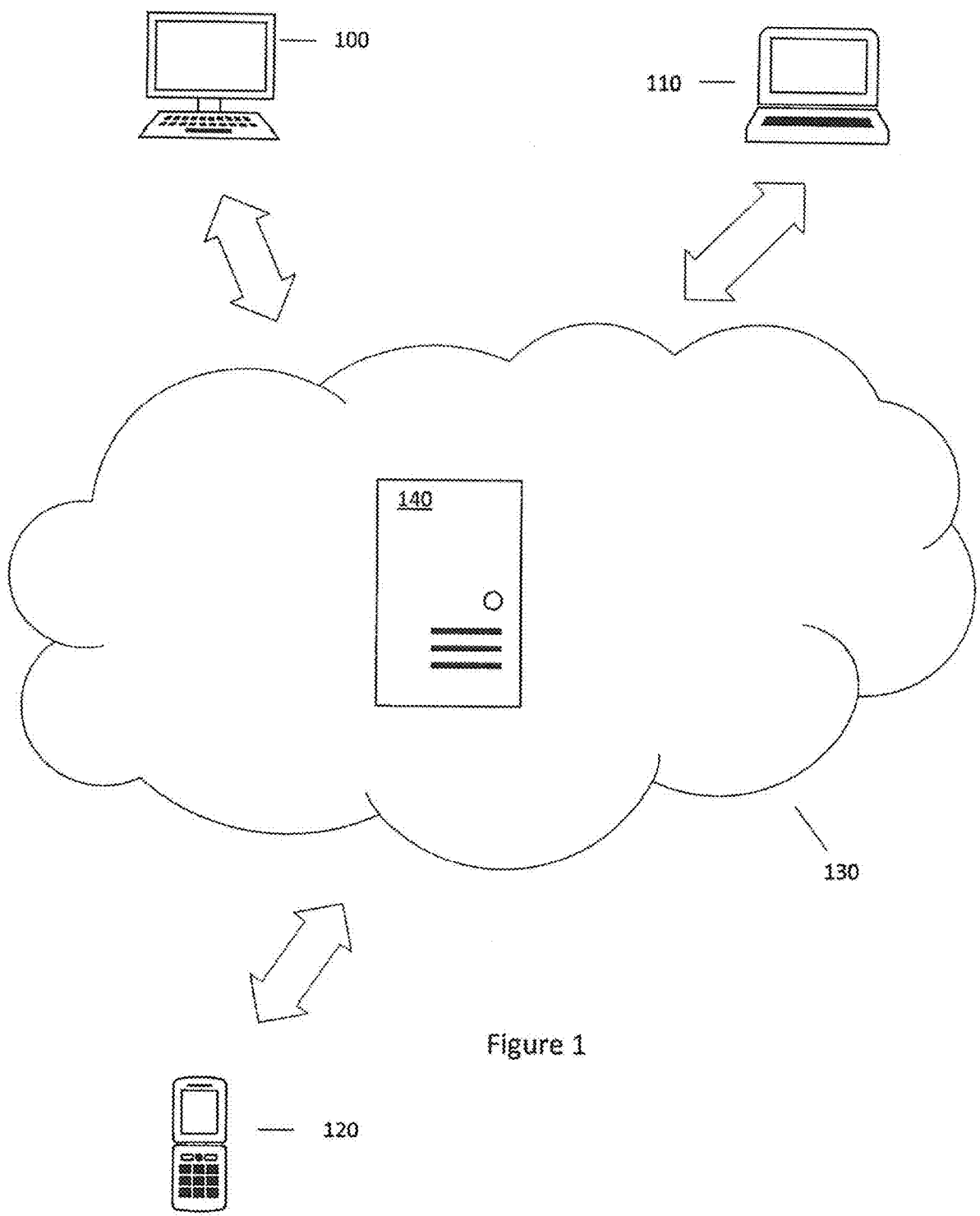
FIG. 1 illustrates a networked computer system with which an embodiment may be implemented.

FIG. 1 illustrates a networked computer system with which an embodiment of the video conferencing session may be implemented. In one approach, a server computer 140 is coupled to a network 130, which is also coupled to endpoint devices 100, 110, 120. For purposes of illustrating a clear example, FIG. 1 shows a limited number of elements, but in practical embodiments there may be any number of certain elements shown in FIG. 1. For example, the server 140 may represent an instance among a large plurality of instances of the application server in a data center, cloud computing environment, or other mass computing environment. Three endpoint devices are shown. However, there can be any number of endpoint devices.

In an embodiment, the server computer 140 hosts a video conferencing meeting and transmits and receives video, image, and audio data to and from each of the endpoint devices 100, 110, 120.

Each of the endpoint devices 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the endpoint devices 100, 110, 120 may include an integrated or separate display unit such as a computer screen, TV screen or other display. Endpoint devices 100, 110, 120 may comprise any of mobile or stationary computers including desktop computers, laptops, netbooks, ultrabooks, tablet computers, smartphones, etc. Typically, the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the endpoint devices 100, 110, 120 hosts, in an embodiment, an application that allows each of the endpoint devices 100, 110, 120 to communicate with the server computer 140. In an embodiment, the server 140 may maintain a plurality of accounts, each associated with one of the endpoint devices 100, 110, 120 and/or one or more users of the client computers. In one embodiment, each of the endpoint devices 100, 110, and 120 participates in the video conferencing session.

2. GROUP PHOTOGRAPH CREATION

In one embodiment, one of the participants of a web conferencing session can share their screen content with another attendee. To improve the user experience during the video conferencing session, a partial portion of the presenter's screen is shared with another attendee.

Figure 2:
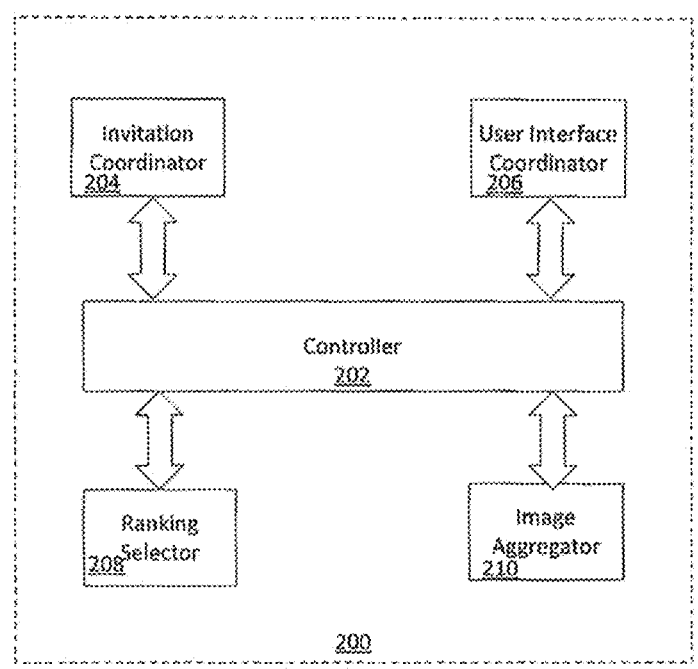
FIG. 2 illustrates a block diagram according to an embodiment.

FIG. 2 illustrates a group photograph creation system 200 showing an exemplary embodiment of a group photograph creation architecture within a video conferencing session that uses a networked computer system. This networked computer system is shown in FIG. 1 as the server computer 140 which is coupled to the network 130, which is also coupled to the endpoint devices 100, 110, 120. In one embodiment, the group photograph creation system 200 is run on the server 140. In another embodiment, the group photograph creation system 200 is run on one of the endpoint devices 100, 110, 120. In yet another embodiment, the group photograph creation system 200 is run on a combination of the server 140 the endpoint devices 100, 110, 120.

In one embodiment, the group photograph creation system 200 includes a controller 202 that is coupled to an invitation coordinator 204, a user interface coordinator 206, a ranking selector 208, and an image aggregator 210.

In one embodiment, the invitation coordinator 204 detects an initiation of a group photograph and polls the participants of the web conferencing session for inclusion into the group photograph. The invitation coordinator 204 also tracks the responses from the participants if they wish to participate in the group photograph. In one embodiment, the invitation coordinator 204 receives the responses through the endpoint devices 100, 110, 120 and further utilizes information an input device 514 and cursor control 516 which comes through the communications interface 518 through computer system 500 where the computer system 500 is one of the endpoint devices 100, 110, 120 for the participant of the video conferencing session.

Figure 6A:
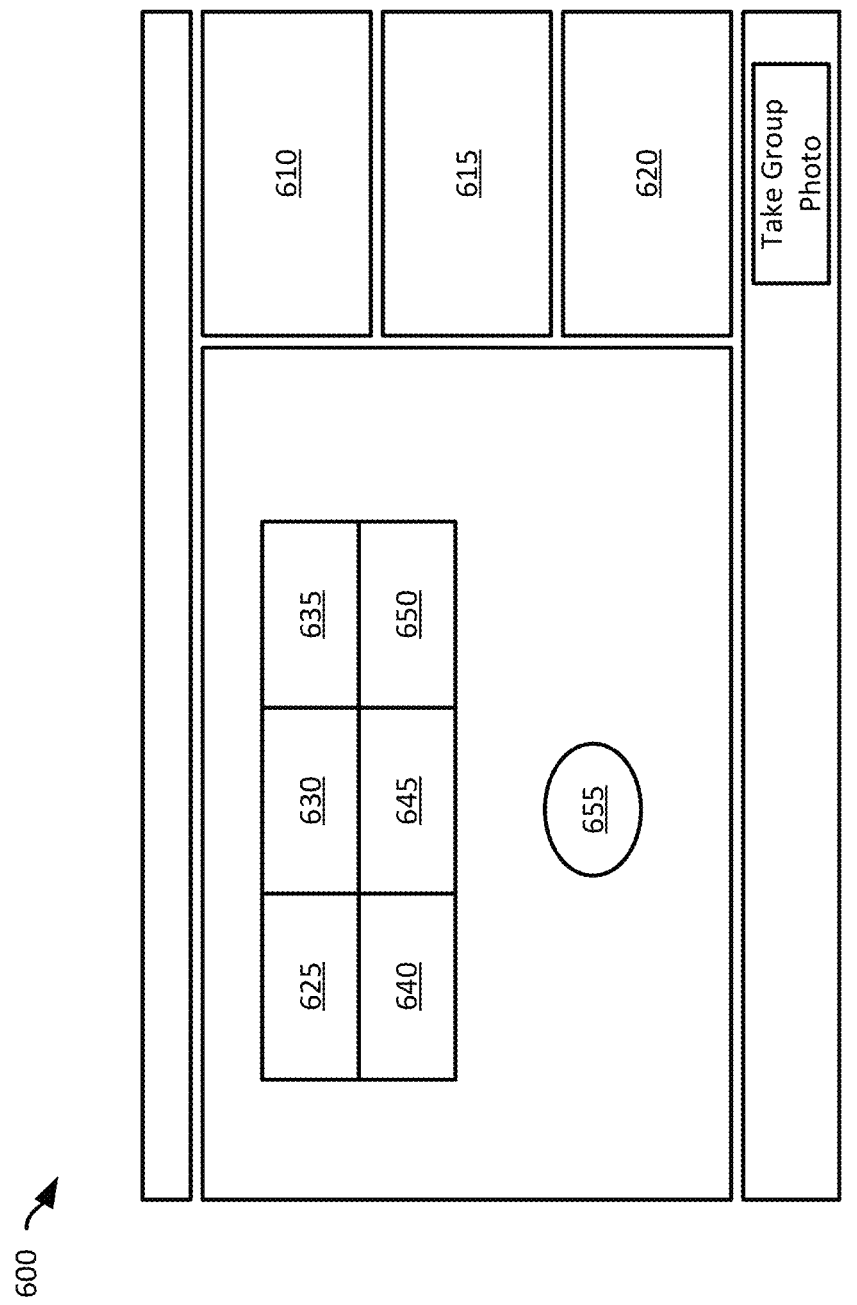

In one embodiment, the user interface coordinator 206 instructs the visual display of the user interface during the video conferencing session. An exemplary visual display of the user interface is shown in FIG. 6a. In one embodiment, the user interface coordinator 206 displays the user interface through a display 512 of the computer system 500 which represents one of the endpoint devices 100, 110, 120.

In one embodiment, the ranking selector 208 receives input from participants of the group photograph on how they rate their own photographs. In one embodiment, the photographs are displayed on the display 512 of the computer system 500 associated with the participant. Based on the photograph being displayed, an input originating through the input device 512 or cursor control 516 is received indicating the rating of the photograph. The ranking selector 208 tracks the ratings and computes scores that represent the popularity of each photograph and the popularity of the aggregate group photograph based on the cumulative scores of the plurality of individual photographs that make up the group photograph.

In one embodiment, the image aggregator 210 identifies individual photographs of individuals who are participating in the group photograph. These individual photographs can be stored on the server 530 or within the main memory 506 or the storage device 510. Based on the ranking selector 208, the image aggregator 210 can create the group photograph by selecting individual photographs to create the group photograph.

3. EXAMPLE EMBODIMENTS

Figure 3:
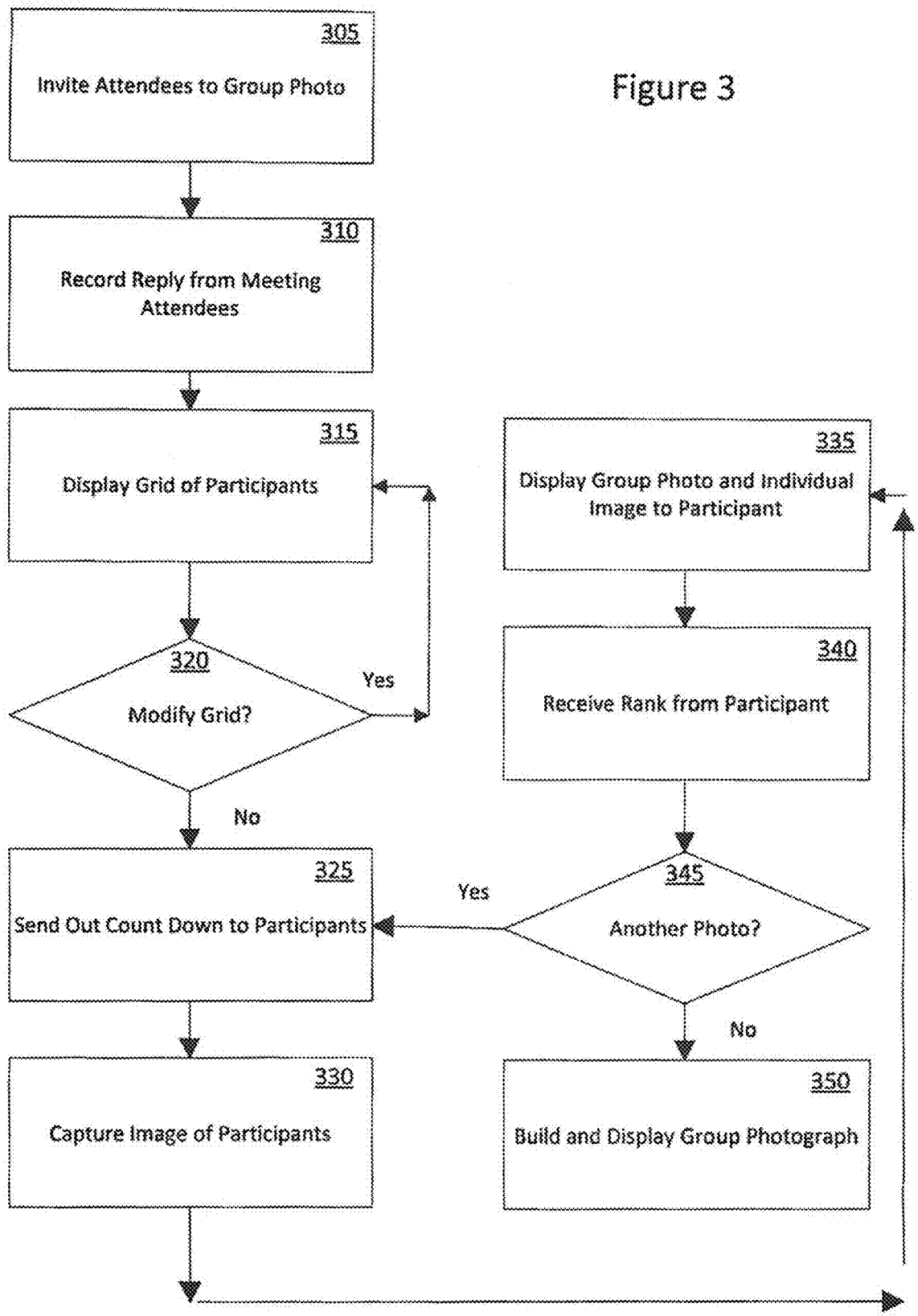
FIG. 3 illustrates a flow diagram according to an embodiment.

FIG. 3, shown below, illustrates a flow diagram that describes various embodiments of creating a group photograph during a video conferencing session. Functional blocks are utilized within the flow diagram to demonstrate different aspects, functional blocks may be combined, divided, or removed without narrowing the scope of the embodiments.

FIG. 3 illustrates an embodiment for creating and managing a group photograph of the attendees of the video conferencing session. In Block 305, a person playing the role of group photographer invites the attendees of the video conferencing session to participate in a group photograph. In this embodiment, the meeting organizer plays the role of group photographer. In another embodiment, the role of group photographer can be assigned to another attendee of the video conferencing session. In one embodiment, the group photographer invites the attendees to a group photograph by selecting an invite option during the video conferencing session which causes an invitation to be sent to each of the attendees. The invitation announces the group photograph and allows each of the attendees to accept or decline the invitation to participate in the group photograph.

In Block 310, the replies from the group photograph invitation described in Block 305 are recorded. For example, the acceptance or declination for the group photograph invitation for each attendee is recorded.

In Block 315, a grid that includes a representation of each participant of the group photograph is displayed. Reference FIG. 6A for an exemplary grid containing sections 625, 630, 635, 640, 645, 650. In one embodiment, the names of attendees which declined to participate in the group photograph are listed at the bottom of the grid and will not have their photographs captured and shown on the grid.

In Block 320, the group photographer can modify the grid as displayed in Block 315. This modification can change the order and placement of the participants within the grid.

In Block 325, a countdown timer is sent to the participants of the group photograph. In one embodiment, the countdown timer is displayed on endpoint devices (such as endpoint devices 100, 110, and 120) that are associated with participants of the group photograph. In one embodiment, this count down timer represents the time remaining before the group photograph is taken. The countdown timer will alert the participants on how much time is remaining and allows the participants to prepare for the group photograph such as straightening their hair and clothing and looking at the camera before the group photograph will be taken. An exemplary count down timer display is shown in FIG. 6A as the countdown timer 655.

In Block 330, an image is captured from each endpoint device associated with a participant of the group photograph. For example, a camera on the endpoint device typically captures video of the attendee on a video conferencing session. In this case, the camera on the endpoint device captures a still image of the participant of the group photograph. In one embodiment, the image is captured as the countdown timer goes to zero within Block 325.

Figure 6B:
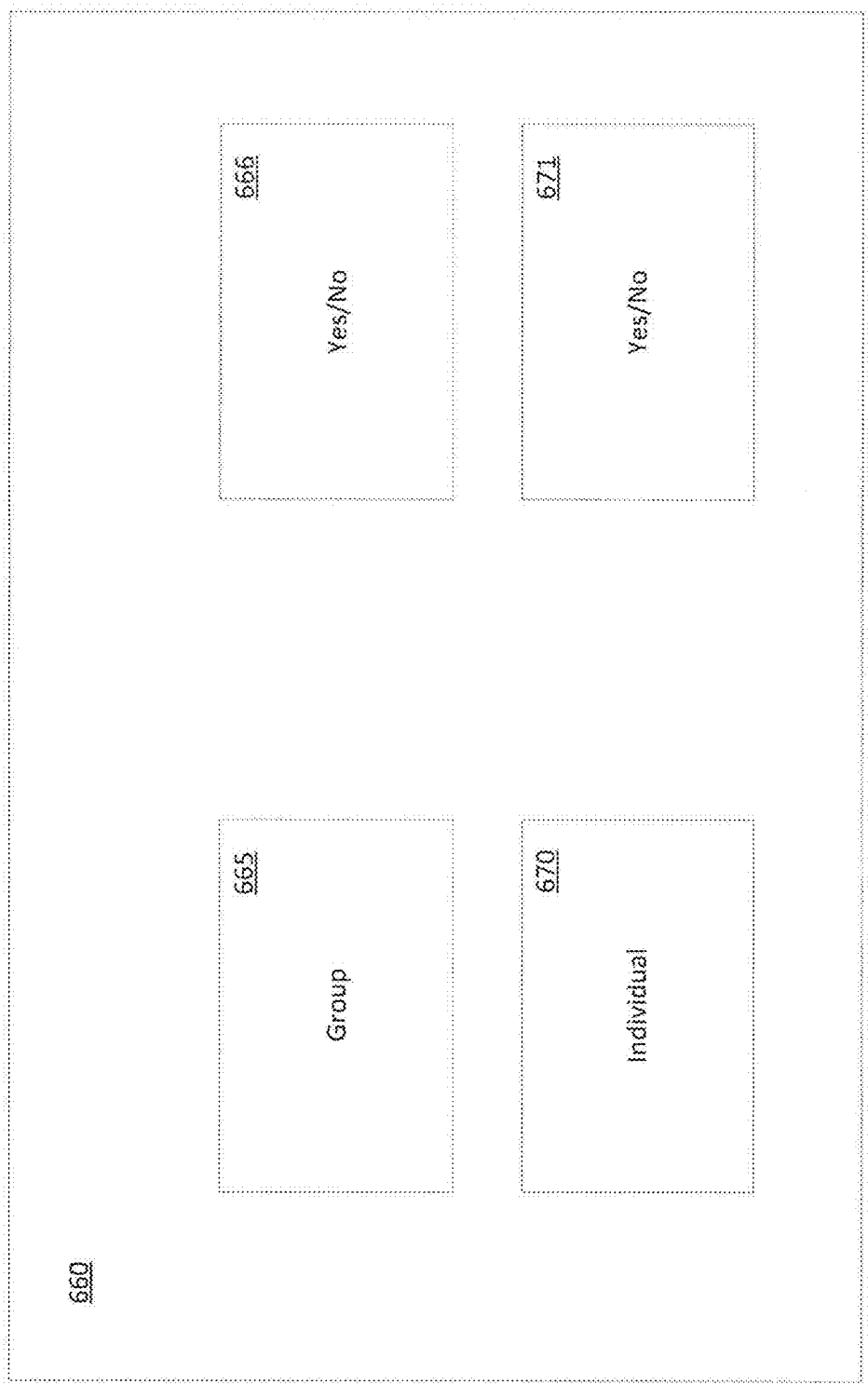

In Block 335, a group photograph is created and displayed to each of the participants of the group photograph. The group photograph has photos of the participants inserted within the grid as shown and referenced in Blocks 315 and 320. An exemplary group photograph is shown in FIG. 6B as group photograph 665. In addition to the group photograph, each of the participants receives their own individual picture associated with them displayed on their associated endpoint device as shown in FIG. 6B as individual photograph 670.

In Block 340, a ranking is received from the participant through the endpoint device. The ranking is given by the participant reflecting how much the participant likes their individual picture. In one embodiment, the ranking is a simple yes or no. In another embodiment, the ranking is a number between 1-10 with 1 being very disliked and 10 being very much liked. An exemplary individual photograph ranking is shown in FIG. 6B as ranking 671. In another embodiment, another ranking that reflects on the entire group photograph is received from the participant. This group photography ranking reflects how much the participant likes the group photograph. An exemplary group photograph ranking is shown in FIG. 6B as ranking 666.

In another embodiment, the ranking can also be received from the participant with respect to the overall group photograph.

In Block 345, there is an option for additional group photographs to be taken. For example, multiple group photographs are captured of the participants to get the best group photograph. With a group, there is rarely a time when taking only a single group photograph would be enough to get a photograph where most people are smiling and not blinking their eyes when the images are captured. In one example, if there are three group photographs to be taken, then Blocks 325, 330, 335, and 340 are performed three times.

In one embodiment, when all the participants rank their individual photograph as one that they like, there is no need to take further group photographs. Similarly, when all the participants rank the collective group photograph as one that they like, there is no need to take further group photographs. In one embodiment, a minimum number and maximum number of group photographs can be set. By setting a minimum and maximum, a balance will be achieved with enough variety of group photographs and respecting the time and patience of the participants.

In Block 350, a final group photograph is created and displayed. In one embodiment, the final group photograph is created based on the participant rankings described in Block 340 and shown in FIG. 4. In one embodiment, the best group photograph based on participant rankings is selected among the plurality of group photographs taken. For example, in one embodiment, if three group photographs are taken, the group photograph that is ranked highest by the participants among the 3 photographs is selected as the final group photograph. In this embodiment, the number of positive responses (such as "Yes" vs "No") or the highest numerical rating which reflects the most liked group photograph will identify the best group photograph.

In another embodiment having three photographs taken, the highest ranked individual photographs corresponding to a unique participant are identified and displayed within the display grid according to Block 315 to form the group photograph. For example, with three group photographs taken, each participant has three individual photographs with each one ranked according the participant's preferences. The highest ranked individual photograph is selected for each participant to be included in the group photograph. Accordingly, the group photograph will include the best individual photograph of each participant out of the three photographs taken. For example, within FIG. 4, participant 1 within column 410 shows that either group photos 1 or 2 would be considered the highest ranked individual photograph for participant 1, and either of these photos would be included in the group photograph for participant 1.

FIG. 4 illustrates a database 400 which includes columns 405, 410, 415, and 420. Column 405 represents the group photograph event. For example, group photo 1 within column 405 represents the first group photograph taken of the participants. In this case, the participants are participant 1, participant 2, and participant N as show in columns 410, 415, and 420, respectively. Group photo 2 and group photo 3 within column 405 represent the second and third group photographs taken, respectively. This example shows three group photographs taken, however, any number of group photographs can be taken. The "yes" and "no" responses within columns 410, 415, and 420 are ratings provided by each of the participants 1, 2, and N, respectively. These ratings are given by each of the participants based on their opinion of their individual photographs during each of the group photographs. The ratings are shown as binary "yes" and "no" responses, however, a numerical rating can be given in different embodiments.

FIG. 6A illustrates an exemplary screen shot 600 of a representative user interface for a participant of the group photograph. The screen shot 600 includes sections 605, 610, 615, and 620. In one embodiment, section 605 displays a grouping of individual images of the participants. For example, the current screen shot 600 shows six participants. In this embodiment, there is an exemplary image showing a participant within each of the sections 625, 630, 635, 640, 645 and 650. Further, section 610 can include an image of the participant viewing the screen shot 600. The participant viewing the screen shot 600 is able to select one of the participants shown within the sections 625, 630, 635, 640, 645 and 650 to be shown in one of the sections 615 and 620. Sections 610, 615 and 620 are larger and can show the image of the respective participants in a larger more easily seen format. A representative count down timer 655 can be displayed anywhere within the screen shot 600.

In use, the screen shot 600 is displayed to the participant of the group photograph during the process of modifying the grid and capturing the group photograph. For example, the screen shot 600 could be displayed during the process as described in Blocks 315, 320, and 330. The participant viewing the screen shot 600 is able to view live video feeds of other participants and themselves within sections 605, 610, 615, 620. 625. 630, 635, 640, 645, and 650, while the grid within sections 625, 630, 635, 640, 645, 650 are being modified and also while the countdown timer 655 counts down toward capturing the group photograph. This allows the participant viewing the screen shot 600 to participate in the process of capturing the group photograph while viewing all the participants of the group photograph within section 605 as well as larger video feeds of selected participants and themselves in sections 610, 615, and 620. The near real-time video feeds within sections 605, 610, 615, 620. 625. 630, 635, 640, 645, and 650 can be viewed prior to the count down for the group photograph through the countdown timer 655.

FIG. 6B illustrates a screen shot 660 to be viewed by a participant of the group photograph after the group photograph has been taken in Block 330 and while displaying the group photograph in Block 335 and receiving the ranking in Block 340. The screen shot 660 includes a group photograph 665 and associated group ranking 666; and further includes an individual photograph 670 and associated individual ranking 671. The group photograph 665 includes the individual photographs of each participant. The individual photograph 670 includes the individual photograph of the participant associated with viewing the screen shot 660. In one embodiment, the group photograph 665 and the individual photograph 670 are still images of the participants while the group photograph was captured in Block 330. In another embodiment, the group photograph 665 and the individual photograph 670 are video clips of the participants that were captured in the time proximity of the group photograph being captured in Block 330.

In one embodiment, the screen shot 660 also includes a countdown timer 672. The countdown timer 672 signals the amount of time left to provide a rating for the group photograph 665 and the individual photograph 670. After the countdown timer 672 goes to zero without the group ranking 666 and the individual ranking 671 being selected, a default "yes" is entered for both the group ranking 666 and the individual ranking 671.

FIG. 6C illustrates a screen shot 675 of a group photograph 680 and text 685. The group photograph 680 is selected and created during Block 350 and represents the resultant group photograph of the participants of the group photograph. The text 685 represents attendees of the video conferencing session that declined to participate in the group photograph in Blocks 305 and 310.

4. EXAMPLE IMPLEMENTATION MECHANISM-HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
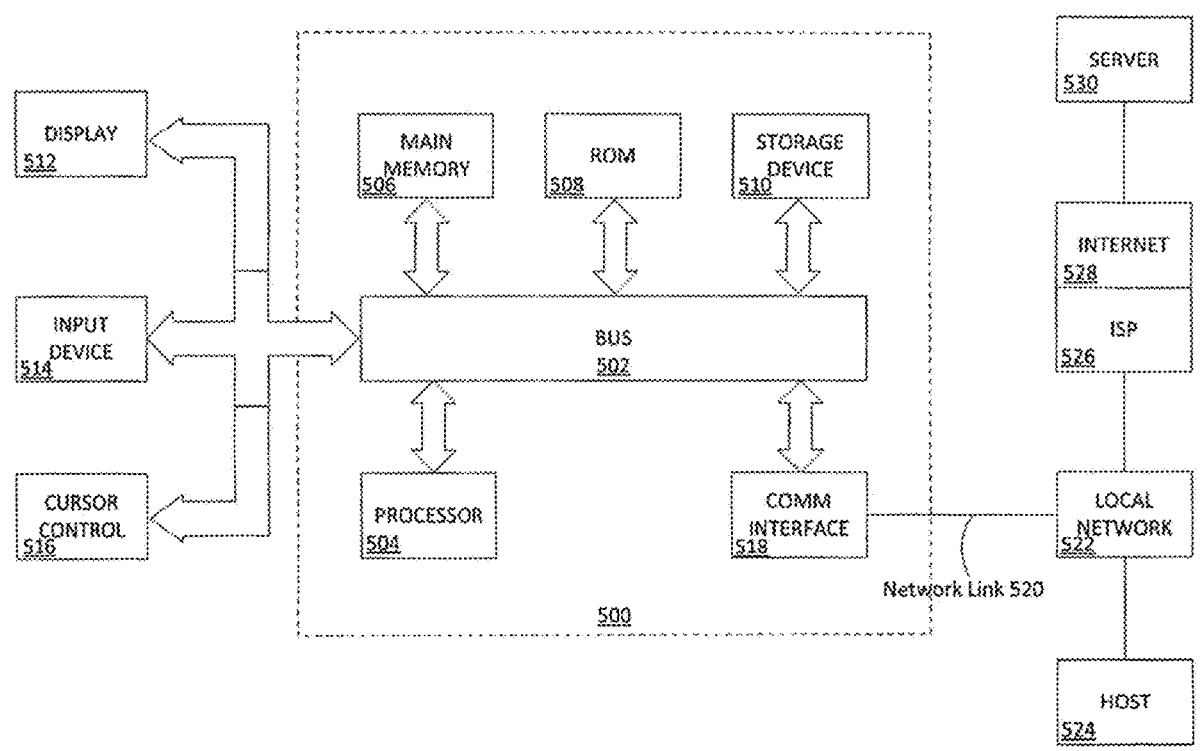
FIG. 5 illustrates a computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 1002. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 1004 as it is received, and/or stored in storage device 510, or other non-volatile storage for later execution. In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for taking a group photograph during a video conference, the method comprising:
    receiving, from a first user equipment (UE) during a video conference, a first ranking for a first photograph;
    generating a score based on the first ranking; and
    generating a group photograph based on the score.

2. The method of claim 1, further comprising:
    displaying, via the first UE, the first photograph; and
    providing, via the first UE, a request for a ranking of the first photograph.

3. The method of claim 1, further comprising:
    receiving, from a second UE during a video conference, a second ranking for a second photograph; and
    generating the score based on the first ranking and the second ranking.

4. The method of claim 1, wherein the first photograph comprises a still image of a video stream associated with the first UE during the video conference, and the method further comprises:
    transmitting, to the first UE, a request to capture a second photograph based on the score;
    providing, via the first UE, a request for a ranking of the second photograph; and
    generating the score based on the ranking of the second photograph.

5. The method of claim 1, wherein the first photograph comprises a still image of a plurality of video streams associated with a plurality of UE during the video conference, and the method further comprises:
    receiving, from each of the plurality of UE during the video conference, a ranking of the first photograph; and
    generating the score based on the ranking received from each of the plurality of UE.

6. The method of claim 1, further comprising:
    receiving, from the first UE during the video conference, a first group ranking for the group photograph;
    receiving, from at least one other UE during the video conference, a second group ranking for the group photograph; and
    generating a cumulative score for the group photograph based on the first group ranking and the second group ranking.

7. The method of claim 1, further comprising:
generating a grid in which a first video stream associated with the first UE is organized in a first configuration; and
responsive to receiving the first ranking, modifying the grid so that the first video stream is organized in a second configuration that is different from the first configuration, by changing a placement of the first video stream within the grid.

8. One or more non-transitory computer readable media including instructions that, when executed by one or more processors, cause the one or more processors to perform the steps of:
receiving, from a first user equipment (UE) during a video conference, a first ranking for a first photograph;
generating a score based on the first ranking; and
generating a group photograph based on the score.

9. The one or more non-transitory computer readable media of claim 8, wherein the instructions further cause the one or more processors to perform the steps of:
displaying, via the first UE, the first photograph; and
providing, via the first UE, a request for a ranking of the first photograph.

10. The one or more non-transitory computer readable media of claim 8, wherein the instructions further cause the one or more processors to perform the steps of:
receiving, from a second UE during a video conference, a second ranking for a second photograph; and
generating the score based on the first ranking and the second ranking.

11. The one or more non-transitory computer readable media of claim 8, wherein the instructions to cause the one or more processors to perform the steps of:
generating a grid in which a first video stream associated with the first UE is organized in a first configuration; and
responsive to receiving the first ranking, modifying the grid so that the first video stream is organized in a second configuration that is different from the first configuration, by changing a placement of the first video stream within the grid.

12. The one or more non-transitory computer readable media of claim 8, wherein the first photograph comprises a still image of a video stream associated with the first UE during the video conference, and wherein the instructions further cause the one or more processors to perform the steps of:
transmitting, to the first UE, a request to capture a second photograph based on the score;
providing, via the first UE, a request for a ranking of the second photograph; and
generating the score based on the ranking of the second photograph.

13. The one or more non-transitory computer readable media of claim 8, wherein the first photograph comprises a still image of a plurality of video streams associated with a plurality of UE during the video conference, and wherein the instructions further cause the one or more processors to perform the steps of:
receiving, from each of the plurality of UE during the video conference, a ranking of the first photograph; and
generating the score based on the ranking received from each of the plurality of UE.

14. The one or more non-transitory computer readable media of claim 8, wherein the instructions further cause the one or more processors to perform the steps of:
receiving, from the first UE during the video conference, a first group ranking for the group photograph;
receiving, from at least one other UE during the video conference, a second group ranking for the group photograph; and
generating a cumulative score for the group photograph based on the first group ranking and the second group ranking.

15. An article of manufacture for use in a digital processing system able to facilitate a video conferencing session, the article of manufacture including a non-transitory computer-readable medium storing program code, the program code being executable be one or more processors to cause the one or more processors to perform operations comprising:
receiving, from a first user equipment (UE) during a video conference, a first ranking for a first photograph;
generating a score based on the first ranking; and
generating a group photograph based on the score.

16. The article of manufacture of claim 15, wherein the operations further comprise:
receiving, from a second UE during a video conference, a second ranking for a second photograph; and
generating the score based on the first ranking and the second ranking.

17. The article of manufacture of claim 15, wherein the first photograph comprises a still image of a video stream associated with the first UE during the video conference, and wherein the operations further comprise:
transmitting, to the first UE, a request to capture a second photograph based on the score;
providing, via the first UE, a request for a ranking of the second photograph; and
generating the score based on the ranking of the second photograph.

18. The article of manufacture of claim 15, wherein the first photograph comprises a still image of a plurality of video streams associated with a plurality of UE during the video conference, and wherein the operations further comprise:
receiving, from each of the plurality of UE during the video conference, a ranking of the first photograph; and
generating the score based on the ranking received from each of the plurality of UE.

19. The article of manufacture of claim 15, wherein the operations further comprise:
receiving, from the first UE during the video conference, a first group ranking for the group photograph;
receiving, from at least one other UE during the video conference, a second group ranking for the group photograph; and
generating a cumulative score for the group photograph based on the first group ranking and the second group ranking.

20. The article of manufacture of claim 15, wherein the operations further comprise:
generating a grid in which a first video stream associated with the first UE is organized in a first configuration; and
responsive to receiving the first ranking, modifying the grid so that the first video stream is organized in a second configuration that is different from the first configuration, by changing a placement of the first video stream within the grid.

* * * * *